(12) United States Patent
Suzuki

(10) Patent No.: US 9,503,629 B2
(45) Date of Patent: Nov. 22, 2016

(54) IMAGE PROCESSING APPARATUS, IMAGE PROCESSING METHOD, AND COMPUTER-READABLE DEVICE HAVING INSTRUCTIONS FOR GENERATING FOCUSED IMAGE

(75) Inventor: Naho Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 628 days.

(21) Appl. No.: 13/050,340

(22) Filed: Mar. 17, 2011

(65) Prior Publication Data

US 2011/0227950 A1 Sep. 22, 2011

(30) Foreign Application Priority Data

Mar. 19, 2010 (JP) ................................. 2010-065022

(51) Int. Cl.
*G06T 15/00* (2011.01)
*H04N 5/232* (2006.01)
*H04N 5/262* (2006.01)

(52) U.S. Cl.
CPC ...... *H04N 5/23216* (2013.01); *H04N 5/23229* (2013.01); *H04N 5/2621* (2013.01)

(58) Field of Classification Search
CPC ................................ H04N 5/225; G06T 3/40
USPC ............................................. 348/340, 231.99
See application file for complete search history.

(56) References Cited

U.S. PATENT DOCUMENTS

| | | | |
|---|---|---|---|
| 5,253,338 A * | 10/1993 | Tanaka | 345/629 |
| 6,052,493 A * | 4/2000 | Shimakawa | 382/300 |
| 8,423,915 B2 * | 4/2013 | Aida et al. | 715/862 |
| 2008/0033641 A1 * | 2/2008 | Medalia | 701/209 |
| 2008/0144107 A1 * | 6/2008 | Lieb | 358/1.18 |
| 2008/0303812 A1 * | 12/2008 | Dohta | 345/419 |
| 2009/0244090 A1 * | 10/2009 | Zhang | G06K 9/2036 345/619 |
| 2010/0066559 A1 * | 3/2010 | Judelson | 340/825.49 |
| 2010/0128145 A1 * | 5/2010 | Pitts et al. | 348/231.99 |
| 2011/0018811 A1 * | 1/2011 | Miernik | 345/173 |
| 2011/0161872 A1 * | 6/2011 | Abramson | G01C 21/367 715/800 |

FOREIGN PATENT DOCUMENTS

| | | |
|---|---|---|
| CN | 101124612 A | 2/2008 |
| EP | 0738082 A2 | 10/1996 |
| EP | 2154648 A1 | 2/2010 |
| JP | 05-180618 A | 7/1993 |

(Continued)

OTHER PUBLICATIONS

Sugimoto et al., Generation of Virtual Focal Plane Picture from Multiple Stereo Picture That Uses High Speed Flat Surface Pose Estimation. Picture Laboratory. Japan Industrial Publishing Co., Ltd. Jan. 10, 2010; 21 (1):6-11.

*Primary Examiner* — Weiming He

(74) *Attorney, Agent, or Firm* — Wolf, Greenfield & Sacks, P.C.

(57) ABSTRACT

An image processing apparatus includes: a display section having the function of detecting a position touched by a pointer; an icon display control section for identifying a pixel of interest which is a pixel associated with the position of the pointer from among pixels forming an image displayed at the display section and displaying an icon for indicating the pixel of interest on the image displayed at the display section; and an image processing section for generating an image focused in a part thereof associated with the pixel of interest using distance data associated with the pixels forming the image.

49 Claims, 11 Drawing Sheets

(56) References Cited

FOREIGN PATENT DOCUMENTS

| | | |
|---|---|---|
| JP | H08289305 A | 11/1996 |
| JP | 2001-331806 A | 11/2001 |
| JP | 2003-141506 A | 5/2003 |
| JP | 2004-152217 A | 5/2004 |
| JP | 2004-289383 A | 10/2004 |
| JP | 2007-072233 A | 3/2007 |
| JP | 2007-322259 A | 12/2007 |
| JP | 2008-021228 A | 1/2008 |
| JP | 2008-079193 A | 4/2008 |
| JP | 2008-145263 A | 6/2008 |
| JP | 2009-015828 A | 1/2009 |
| JP | 2009-096274 A | 5/2009 |
| JP | 2009-218806 A | 9/2009 |
| JP | 2009-224982 A | 10/2009 |
| JP | 2009-253873 A | 10/2009 |
| JP | 2009-301282 A | 12/2009 |

* cited by examiner

IMAGE PROCESSING APPARATUS, IMAGE PROCESSING METHOD, AND COMPUTER-READABLE DEVICE HAVING INSTRUCTIONS FOR GENERATING FOCUSED IMAGE

BACKGROUND OF THE INVENTION

1. Field of the Invention

The present invention relates to an image processing apparatus. Particularly, the invention relates to an image processing apparatus, an image processing method, and an image processing program for performing image processes such as a defocus process and also to a recording medium having such an image processing program recorded therein.

2. Description of the Related Art

As a result of recent spread of digital cameras, various types of digital image processing are performed on still images photographed using digital cameras. A defocus process is one of such processes. A defocus process is a process of varying the amount of defocus imparted to a still image.

According to a technique used for a defocus process, when a pixel to be focused is selected in a still image, the amount of defocus imparted to each pixel of the still image is uniquely made different from others such that a region associated the pixel of interest will be focused. According to this technique, a plurality of still images of the same scene are obtained at respective focal distances, and three-dimensional distances are calculated based on the plurality of still images to impart different amounts of defocus (for example, see JP-A-2003-141506 (Patent Document 1)).

However, the approach necessitates a plurality of still images acquired at different focal distances, and it has not been possible to perform a defocus process using only one still image.

According to a technique proposed to cope with such a problem, when a display unit displaying one still image is touched, a defocus process is performed according to a depth map of the still image such that a region associated with the pixel in the touched position (hereinafter referred to as "pixel of interest"). For example, see JP-A-2009-15828 (Patent Document 2). A depth map is a collection of distance data representing distances between a lens and an object (hereinafter referred to as "lens-object distances"). The data are associated with each pixel group formed by a plurality of pixels forming a still image obtained by photographing the object. Alternatively, the data are associated with each pixel of the still image.

Therefore, a lens-object distance can be identified by referring to the distance data of a depth map.

FIG. 14 is an illustration of a still image displayed on a display unit.

A still image 702 is an image showing an object 703 which is a dog and an object 704 which is a cat located near the dog.

FIG. 15 is an illustration showing a relationship between the positions that an imaging lens 706 and the objects 703 and 704 assumed when the still image 702 was photographed (when the image was acquired).

As shown in FIG. 15, the object 703 is located closer to the imaging lens 706 than the object 704 is. The object 704 is located further from the imaging lens 706 than the object 703 is. That is, the lens-object distances of the region associated with pixels forming the object 703 are smaller than the lens-object distances of the region associated with pixels forming the object 704.

FIG. 16 is a distribution graph representing a depth map of regions associated with pixels of the still image 1102 shown in FIG. 14 located in positions indicated by the horizontal broken line.

In FIG. 16, lens-object distances indicated by distance data of regions associated with pixels of the image are shown along the vertical axis, and pixel numbers associated to the pixels are shown along the horizontal axis.

A pixel numbered "711" associated with a position 707 constituting the nose of the object 703 on the left end thereof has the smallest lens-object distance. A pixel numbered "712" associated with a position 708 constituting the right end of a swimming ring that the object 704 wears has the greatest lens-object distance. Although the pixel numbered "711" (hereinafter referred to as "nose pixel") and the pixel numbered "712" (hereinafter referred to as "swim ring pixel") are pixels located close to each other, there is a significant difference between the lens-object distances of the pixels.

FIG. 17 is an illustration showing how a user selects a pixel of interest from the still image 702 illustrated in FIGS. 14 to 16.

When the user wishes to select the nose pixel as a pixel of interest, the user touches the region of the nose in the still image 702 with a finger 705. At this time, if the nose pixel is accurately touched, the nose pixel is selected as a pixel of interest, and a defocus process is performed such that a region associated with the nose pixel will be focused.

SUMMARY OF THE INVENTION

However, the swim ring pixel located close to the nose pixel may be erroneously selected as a pixel of interest depending on the thickness of the finger 705 of the user or the area touched by the finger which may vary. In such a case, the defocus process may be performed such that a focus is set on a region associated with the swim ring pixel at a lens-object distance which is significantly different from that of the region associated the nose pixel to be focused.

As described above, the technique disclosed in Patent Document 2 may not allow a pixel to be selected as a user wishes, and a pixel shifted from the position of a pixel specified to be focused (a focal point) may be selected. However, the technique provides no means for checking where a focal point has been set. Therefore, a problem may arise in that a defocus process can be performed in a manner undesirable for a user in a still image in which the lens-object distances of adjacent pixels are significantly different from each other.

The technique disclosed in Patent Document 1 also provides no means for checking where a focal point exists. The technique therefore has the same problem as encountered in the technique disclosed in Patent Document 2. Specifically, a defocus process can proceed in a manner undesirable for a user as a result of overlooking of a positional shift of a focal point when performed on such a still image in which the lens-object distances of adjacent pixels can be significantly different from each other.

Under the circumstance, it is desirable to allow a focal point selected by a user to be reliably confirmed by the user such that a defocused image will be obtained as desired by the user.

According to an embodiment of the invention, there is provided an image processing apparatus including a display section having the function of detecting a position touched by a pointer. A pixel of interest which is a pixel associated with the position of the pointer is identified from among pixels forming an image displayed at the display section, and an icon for indicating the pixel of interest is displayed on a screen of the display section. Then, an image focused in a part thereof associated with the pixel of interest is generated using distance data associated with the pixels forming the image.

In the above-described configuration of the embodiment of the invention, the icon indicating the pixel of interest is displayed at the display section, and a defocused image is generated with a part of the image associated with the pixel of interest set in focus.

According to the embodiment of the invention, a user can visually check the position of a pixel of interest from an icon. As a result, the user can properly recognize a pixel of interest selected by him- or herself, which is advantageous for the user in that a defocused image can be obtained as desired.

DESCRIPTION OF THE PREFERRED EMBODIMENTS

Figure 1:
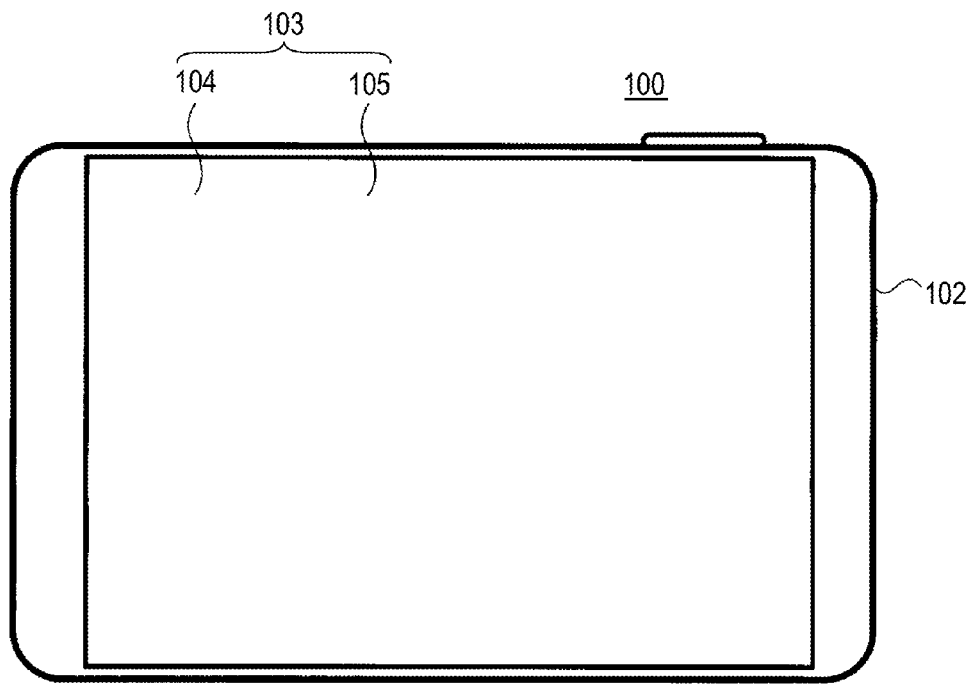
FIG. 1 is an external configuration diagram of an image processing apparatus according to an embodiment of the invention.

An embodiment of the invention will now be described. The embodiment described below is a specific example of the application of the invention. Therefore, the embodiment has technically preferred specifications. However, the invention is not limited to the embodiment unless otherwise stated in the following description. For example, numerical conditions placed on various parameters appearing in the following description are merely preferred examples, and dimensions, shapes, and positional relationships shown in the drawings used for the description provide a schematic outline only.

The following items will be described in the order listed.

1. External Configuration of Image Processing Apparatus
2. Functional Configuration of Image Processing Apparatus
3. Operations of Image Processing Apparatus The embodiment of the invention will now be described with reference to FIGS. 1 to 12.

[1. External Configuration of Image Processing Apparatus]

FIG. 1 is an external configuration diagram of an image processing apparatus according to the embodiment of the invention.

For example, an image processing apparatus 100 may be a personal computer, a digital still camera, a digital video camera, a mobile telephone, a television receiver, or a digital photo frame. The image processing apparatus 100 includes a housing 102 containing electronic devices such as a CPU (central processing unit) and a memory and a display section 103 assembled on a top surface of the housing 102. The display section 103 is formed by a display panel 104 for displaying images and a position detecting panel 105 stacked on the display panel 104 for detecting a position on a detection surface where a pointer is put in contact with the surface or placed on the surface. The pointer may be a finger of a user or a touch pen.

Such an image processing apparatus 100 generates a defocused image by performing a process of varying the amount of defocus imparted to pixels forming an image being displayed on the display panel 104 (hereinafter referred to as "defocus process") based on operations performed by a user on the position detection panel 105. Calculations involved in the defocus process are executed by the electronic devices contained in the housing 102.

[2. Functional Configuration of Image Processing Apparatus]

A functional configuration of the image processing apparatus 100 for implementing the defocus process will now be described with reference to FIG. 2.

Figure 2:
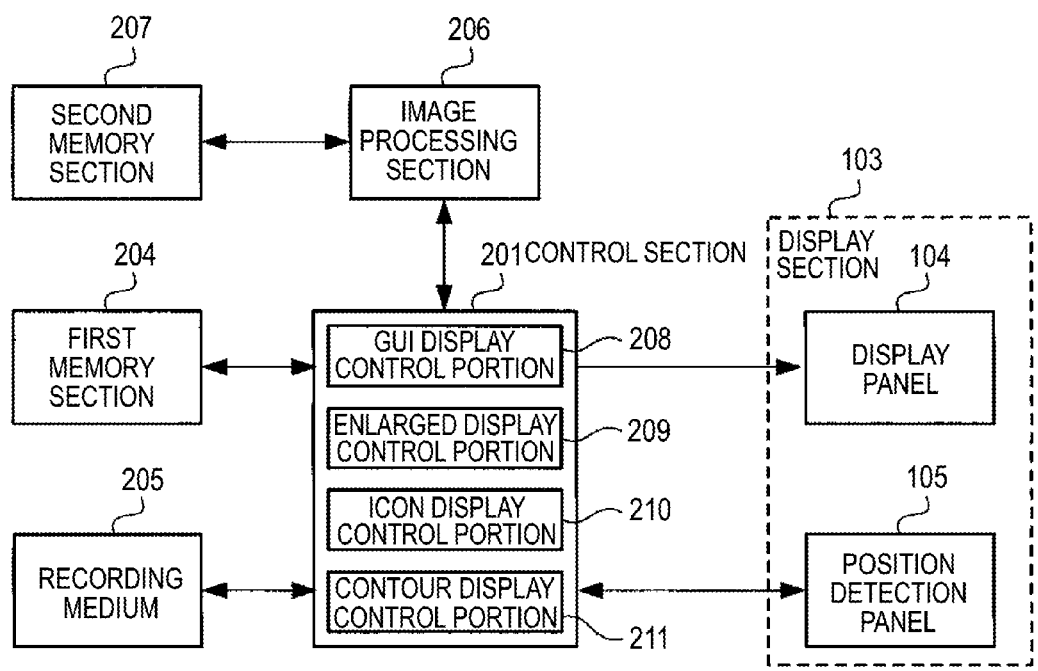
FIG. 2 is a functional block diagram showing a configuration of the image processing apparatus according to the embodiment of the invention.

FIG. 2 is a functional block diagram of the image processing apparatus according to the embodiment of the invention showing a configuration thereof.

As described above, the image processing apparatus 100 includes a display panel 104 and a position detection panel 104 forming a display section 103. Further, the apparatus includes a control section 201, a first memory section 204, a recording medium 205, an image processing section 206, and a second memory section 207 which are electronic devices contained in the housing 102 (see FIG. 1).

The recording medium 205 is a non-volatile recording medium such as a hard disc or flash memory, and various programs used for a defocus process and other processes, images obtained in advance, and a depth map as metadata associated with the images are recorded in the recording medium. A defocused image generated by a defocus process may be also recorded in the recording medium 205. The recording medium 205 may either an incorporated recording medium or an external recording medium.

The depth map is a collection of distance data representing distances between a lens and an object (hereinafter referred to as "lens-object distances"). The data are associated with each pixel group formed by a plurality of pixels forming a still image obtained by photographing the object. Alternatively, the data are associated with each pixel of the still image. The depth map is therefore what is called a distance data distribution. Distance data may be regarded as information indicating the depth of a region of a still image associated with each pixel of the image. A lens-object distance can be identified by referring to the distance data of the depth map.

For example, the TOF (time of flight) method or the depth-from-defocus method may be used as a method for acquiring the distance data. The TOF method is a technique for identifying the distance of an object from the speed of light and a time lag between the emission of light from a light source and the arrival of the light at a sensor after reflection of the same at the object. According to the depth-from defocus method, the distance of an object is calculated from results of an analysis of a defocus amount (a degree of focusing) observed in an image. For example, specific configurations employed to implement those methods are disclosed in JP-A-2009-15828.

The control section 201 controls various blocks thereof such that they will function based on programs acquired from the recording medium 205 and deployed in the first memory section 204. As will be detailed later, the control section 201 acquires a selected image from the recording medium 205, displays the acquired image (hereinafter referred to as "selected image") on the display panel 104, generates various images associated with the selected image, and displays those images on the display panel 104. The selected image is also output to the image processing section 206. For example, the first memory section 204 is constituted by a RAM (random access memory), and data required for operations of the control section 201 are temporarily stored in this section.

The image processing section 206 performs a defocus process on a selected image input from the control section 201 such that a region associated with a pixel of interest (which will be described later) will be focused. The defocus process is performed based on a depth map associated with the selected image.

The image processing section 206 temporarily records data (such as a depth map) required for performing the defocus process in the second memory section 207. A defocused image thus generated is recorded in the recording medium 205 through the control section 201 and output to the display panel 104. The second memory section 207 may be constituted by a RAM like first memory section 204, and a common RAM may serves as those memory sections.

A configuration of the control section 201 will now be described in detail.

In order to display various display screens on the display panel 104, the control section 201 includes a GUI display control portion 208, an enlarged display control portion 209, an icon display control portion 210, and a contour display control portion 211.

The GUI display control portion 208 displays predetermined operational screens ad setting screens on the display panel 104 based on programs stored in the first memory section 204 to provide a graphical user interface (GUI). Further, the control portion 208 generates operation input signals for causing the control section 201 to execute processes desired by a user according to operations performed by the user on the position detection panel 105.

The enlarged display control portion 209 is provided to display an enlarged view of a part of a selected image. When the position of a pointer is detected using the position detection panel 105 while a selected image is displayed on the display panel 104, a pixel associated with the position of the pointer (hereinafter referred to as "detected pointer position") is detected from among the pixels forming the selected image (such a pixel will be hereinafter referred to as "pixel of interest"). A partial region of the display panel 104 is allocated as a small window (an example of a sub screen), and an enlarged image that is an enlarged view of an image of a predetermined region including the pixel of interest is displayed in the small window. The magnification of the enlarged image may be varied depending on the resolution of the selected image. For example, when the resolution of the selected image is higher than the screen resolution of the display panel, the partial region of the selected image is output to the small window with no compression process performed on the selected image to leave the resolution of the image unchanged. Thus, an enlarged image at the greatest magnification will be displayed in the small window.

The icon display control portion 210 is provided to display an icon indicating the position of a pixel of interest to serve as a reference when a defocus process is performed. When an enlarged image is displayed on the display panel 104, a pixel in the selected image corresponding to a pixel of interest (such a pixel hereinafter referred to as "corresponding pixel") is identified from among pixels forming the enlarged image. An icon indicating the corresponding pixel is displayed in the small window on the display panel 104. The icon display control portion 210 moves the icon based on an operation performed by the user on the detection panel with the pointer. Since the corresponding pixel changes as the icon moves, the pixel of interest is also changed as a result of the movement of the icon.

The contour display control portion 211 is provided to display an image of an object with a clear contour. When an enlarged image is displayed on the display panel 104, the contour of the object including a pixel of interest specified by the icon display control portion 210 (such a contour will be hereinafter referred to as "contour of interest") is detected. The control portion controls the display panel 104 such that the contour of interest will be clearly displayed. For example, the contour of interest may be clearly displayed by changing the color of the contour of interest to a highlighting color or changing the color of the region enclosed by the contour of interest.

[3. Operations of Image Processing Apparatus]

Operations of the image processing apparatus will now be described with reference to FIGS. 3 to 11.

Figure 3:
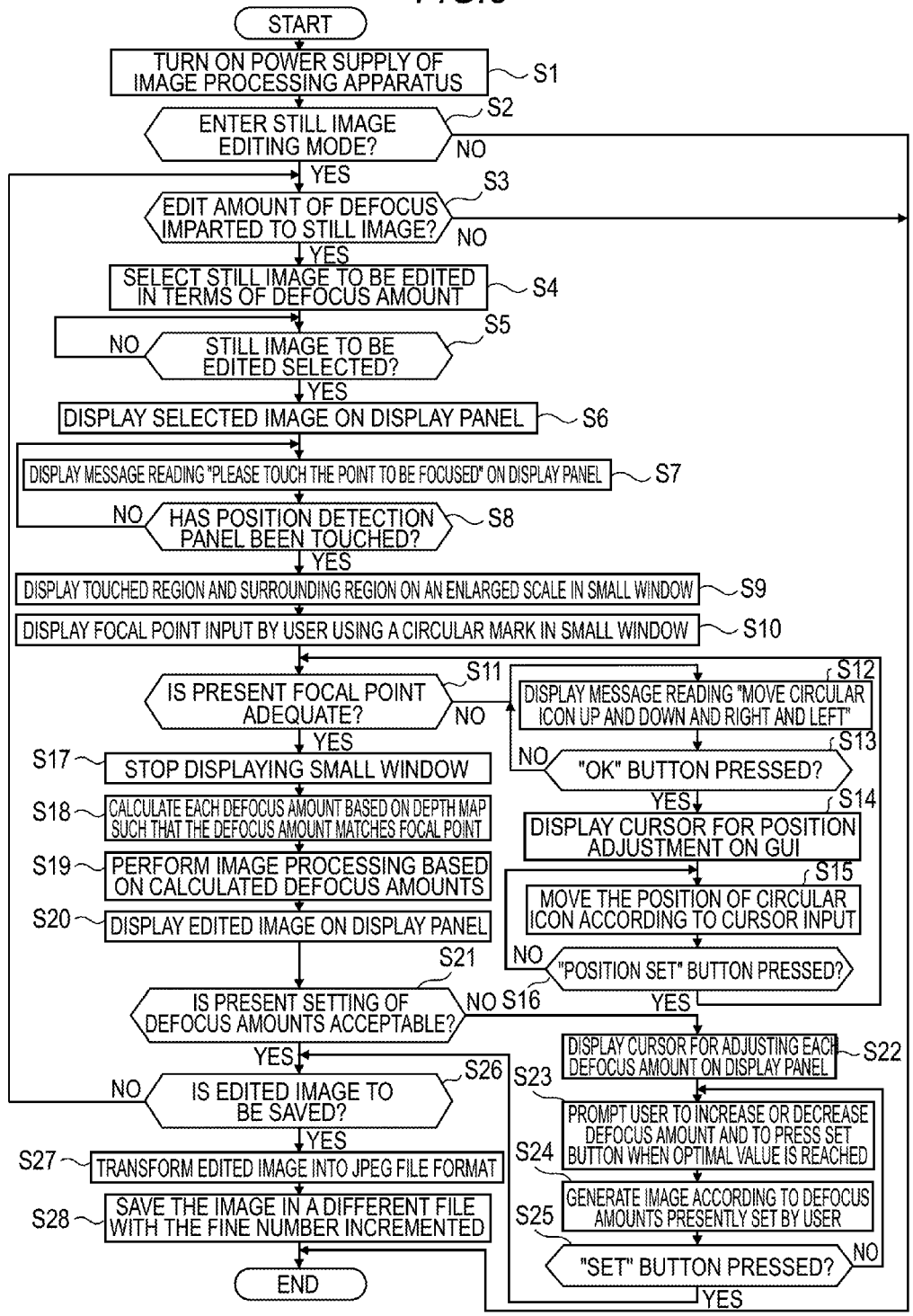
FIG. 3 is a flow chart showing operations of the image processing apparatus according to the embodiment of the invention.

FIG. 3 is a flow chart showing a flow of operations of the image processing apparatus according to the present embodiment of the invention. The processes characteristic of the embodiment of the invention implemented using the configuration shown in FIG. 2 correspond to processes performed at steps S9 to S16 described below.

First, a user turns the power supply of the image processing apparatus 100 on (step S1). Then, the control section 201 checks whether the apparatus is presently set in a mode for editing a still image (hereinafter referred to as "still image editing mode") or not (step S2).

If the apparatus is not set in the still image editing mode (answer at step S2 is NO), the process ends. If the apparatus is set in the still image editing mode (answer at step S2 is YES), the control section 201 further checks whether the apparatus is presently set in a mode for editing a defocus amount of a still image (hereinafter referred to as "defocus amount editing mode") or not (step S3).

If the apparatus is not set in the defocus amount editing mode (answer at step S3 is NO), the process ends. If the apparatus is set in the defocus amount editing mode (answer at step S3 is YES), the control section 201 displays a list of still images recorded in the recording medium 205 on the display panel 104 (step S4).

Figure 4:
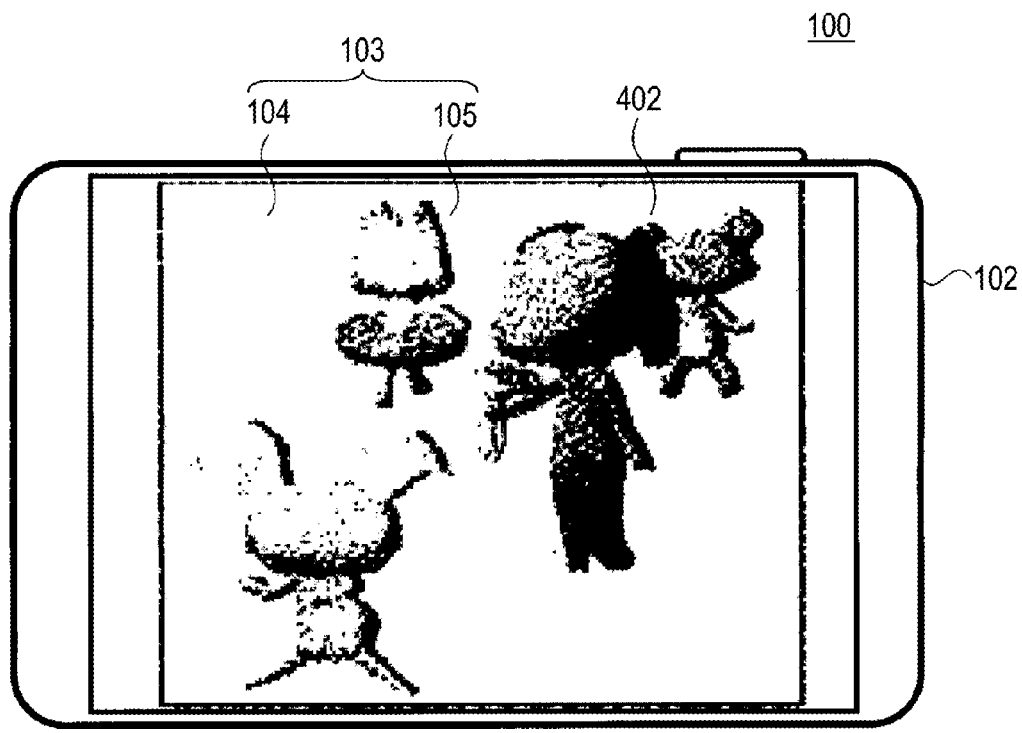
FIG. 4 is an illustration of a screen displayed on a display panel when the process at step S6 in FIG. 3 is performed.

The user selects an image to be edited from among the still images displayed on the display panel 104 using the position detection panel 105 (step S5). Then, the control section 201 displays the selected still image on the display panel 104 as a selected image 402 as shown in FIG. 4 (step S6).

Next, the GUI display control portion 208 generates a GUI including a sentence reading "Please touch a point to be focused" and temporarily displays the GUI on the display panel 104 (step S7). After the GUI is erased from the display panel 104, the control section 201 checks whether the position detection panel 105 has been touched by a pointer (whether the position of the pointer has been detected) or not (step S8). When the position detection panel 105 is left untouched for a certain period of time (answer at step S8 is NO), the flow returns to the process at step S7.

Figure 5:
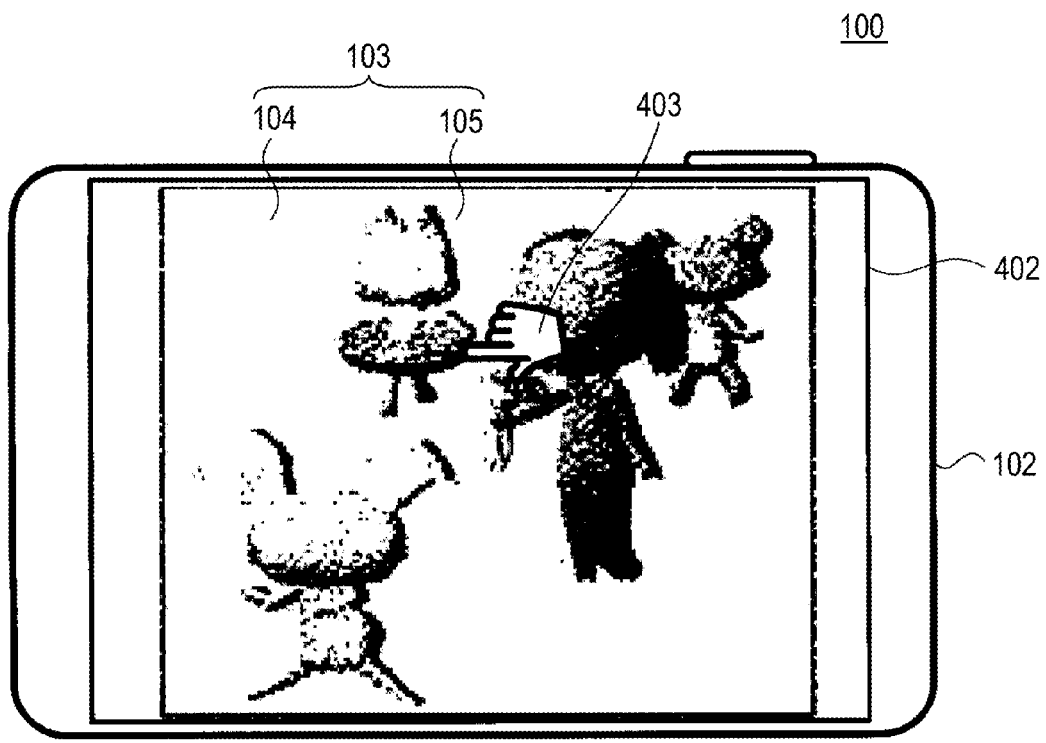
FIG. 5 is an illustration of a screen displayed on a display panel when the process at step S8 in FIG. 3 is performed.
Figure 6:
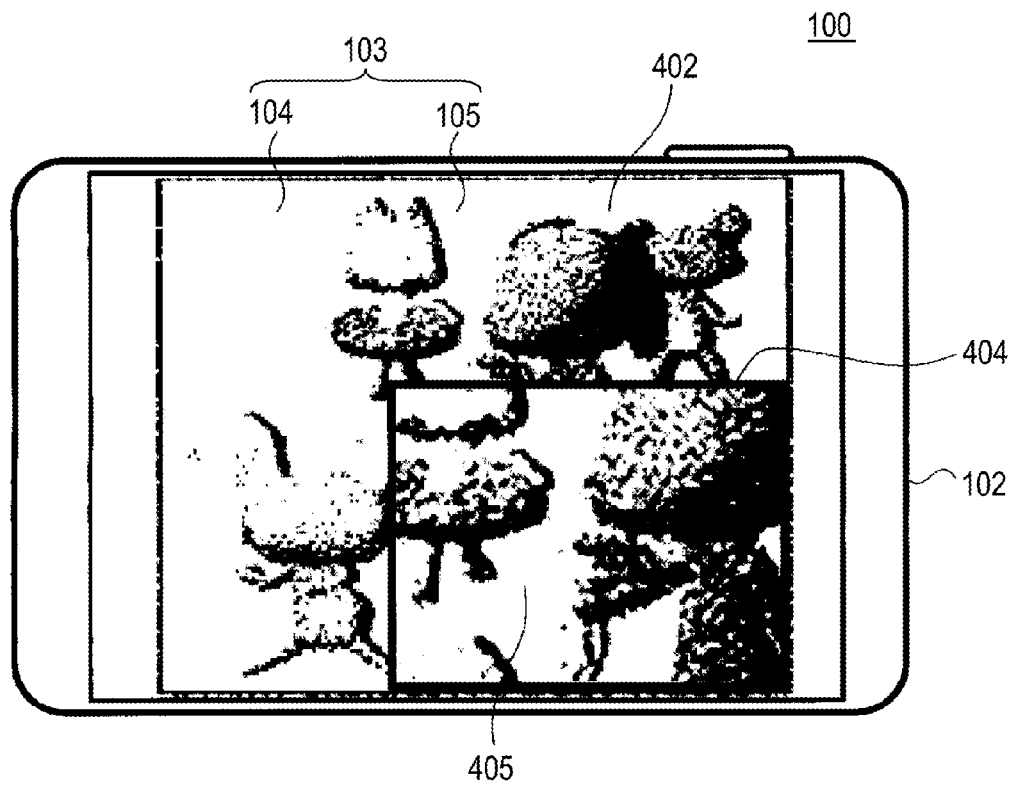
FIG. 6 is an illustration of a screen displayed on a display panel when the process at step S9 in FIG. 3 is performed.

For example, when the position detection panel 105 is touched by a pointer 403 as shown in FIG. 5 (answer at step S8 is YES), the enlarged display control portion 209 detects a pixel of interest associated with the position of the pointer 403 from among pixels forming the selected image 402. For example, a bottom-right partial region of the display panel 104 is allocated as a small window 404 as shown in FIG. 6, and an enlarged image 405 that is an enlarged view of a predetermined region of the selected image 402 including the pixel of interest is displayed in the small window 404 (step S9).

Next, the icon display control portion 210 identifies a corresponding pixel which corresponds to the pixel of interest identified as a result of the process at step S9 from among pixels forming the enlarged image 405. The control portion 210 displays an icon 406 in the form of a circle for indicating the position of the corresponding pixel thus identified in the small window 404 (step S10).

Figure 7:
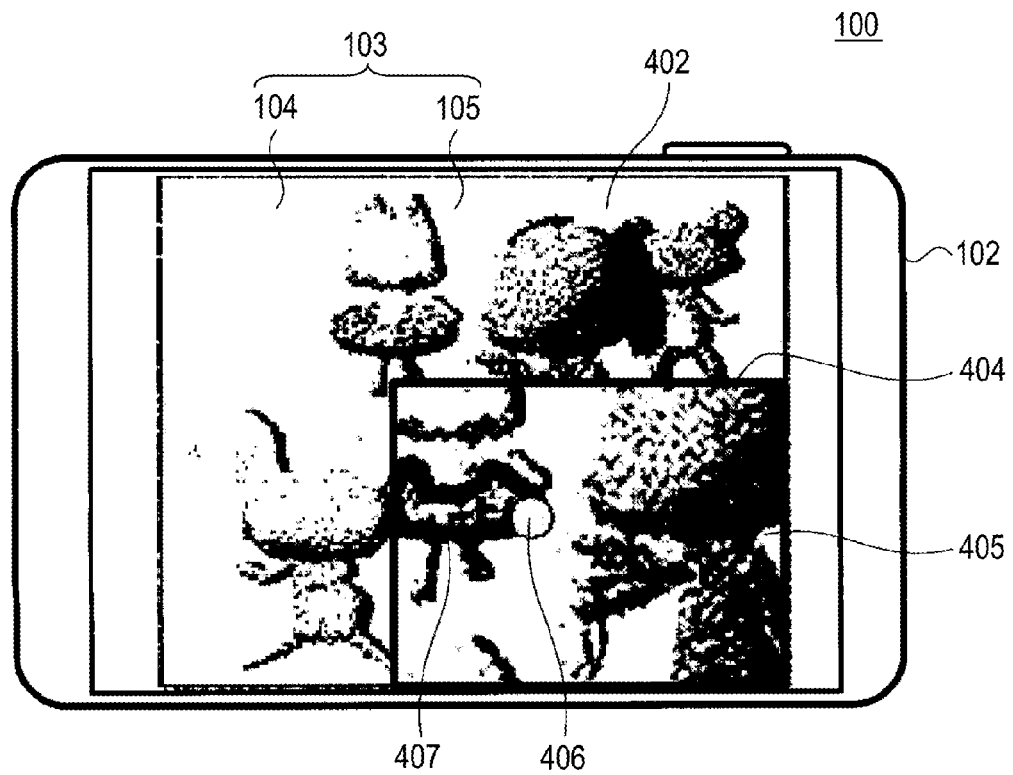
FIG. 7 is an illustration of a screen displayed on a display panel when the process at step S10 in FIG. 3 is performed.

When the corresponding pixel is identified by the process at step S10, the contour display control portion 211 detects the contour of a "swim ring" that is an object including the corresponding pixel as a contour of interest 407, as shown in FIG. 7. The contour of interest 407 is displayed in the small window 404 with a predetermined color imparted to the same. A method of detecting a contour of interest 407 will be described later with reference to FIG. 12.

Figure 8:
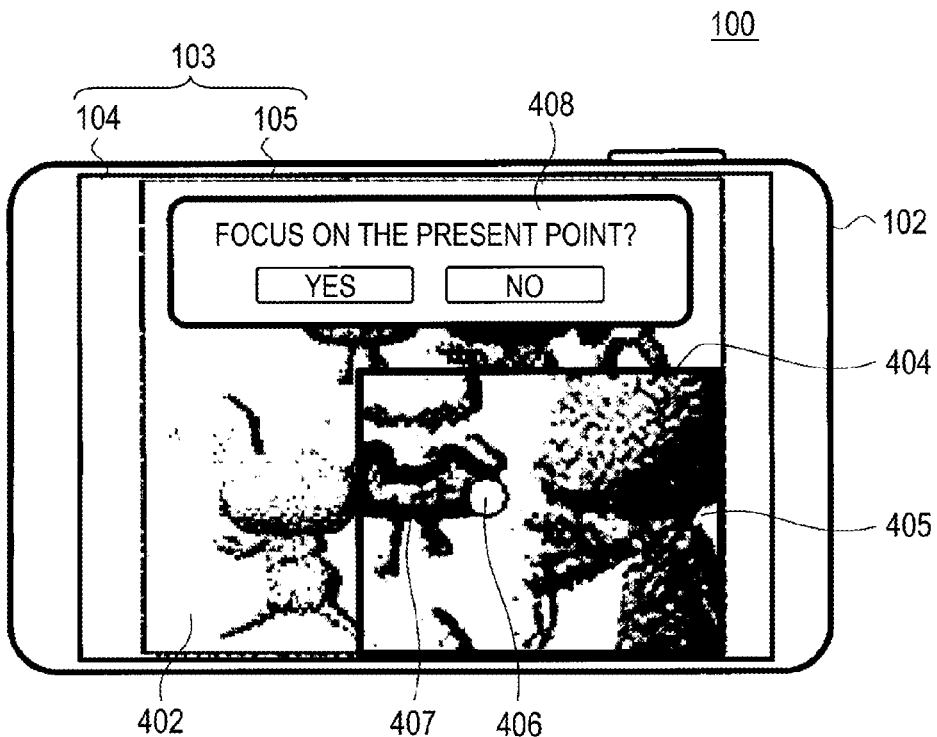
FIG. 8 is an illustration of a screen displayed on a display panel when the process at step S11 in FIG. 3 is performed.

Then, the user is prompted to confirm whether to set the present pixel of interest as a point to be focused. Specifically, the GUI display control portion 208 generates a confirmation GUI 408 including a sentence reading "is the present point to be focused" and "YES" and "NO" buttons, as shown in FIG. 8. The confirmation GUI 408 is disputed in a region of the display panel 104 other than the small window 404 (step S11).

When the "YES" button is touched by the pointer 403 (answer at step S11 is YES), the enlarged display control portion 209 stops displaying the small window 404 (step S17). The image processing section 206 calculates a defocus amount to be applied to each of the pixels forming the selected image utilizing the depth map for the selected image 402 such that the region associated with the present pixel of interest will be focused (step S18). Such a defocus amount may be hereinafter referred to as "defocus amount with pixel of interest in focus". The defocus amount of each of the pixels forming the selected image 402 is changed to the defocus amount with the pixel of interest in focus (step S19). Then, aversion of the selected image having defocus amounts changed as thus described (such a selected image may be hereinafter referred to as "edited image") is input to the display panel 104 and displayed (step S20).

When the above described process is completed, the user is prompted to confirm whether the present defocus amounts are adequate or not. Specifically, the GUI display control portion 208 generates a confirmation GUI including a sentence reading "Are present defocus amounts adequate?" and "YES" and "NO" buttons in the same way as the process at step S10. The confirmation GUI thus generated is displayed on the display panel 104 (step S21). If the "YES" button is touched by the pointer 403 (answer at step S21 is YES), the GUI display control portion 208 stops displaying the confirmation GUI on the display panel 104. Then, the control portion 208 generates a confirmation GUI including a sentence reading "Is the edited image to be saved?" and "YES" and "NO" buttons and displays the GUI on the display panel 104 (step S26). If the "NO" button is touched by the pointer 403 (answer at step S26 is NO), the flow returns to the process at step S3.

If the "YES" button is touched by the pointer 403 (answer at step S26 is YES), the image processing section 206 compresses the data of the edited image according to the JPEG (Joint Photographic Experts Group) standard. Thus, a JPEG type image file is generated (step S27). The control section 201 records the image file generated by the process at step S27 in the recording medium 205 with the file name of the image file incremented (step S28), and the process is terminated. The process at step S28 is a process for changing the file name of the image file to be recorded in the recording medium 205 into a file name different from the file name the image file has had before the edition.

Figure 9:
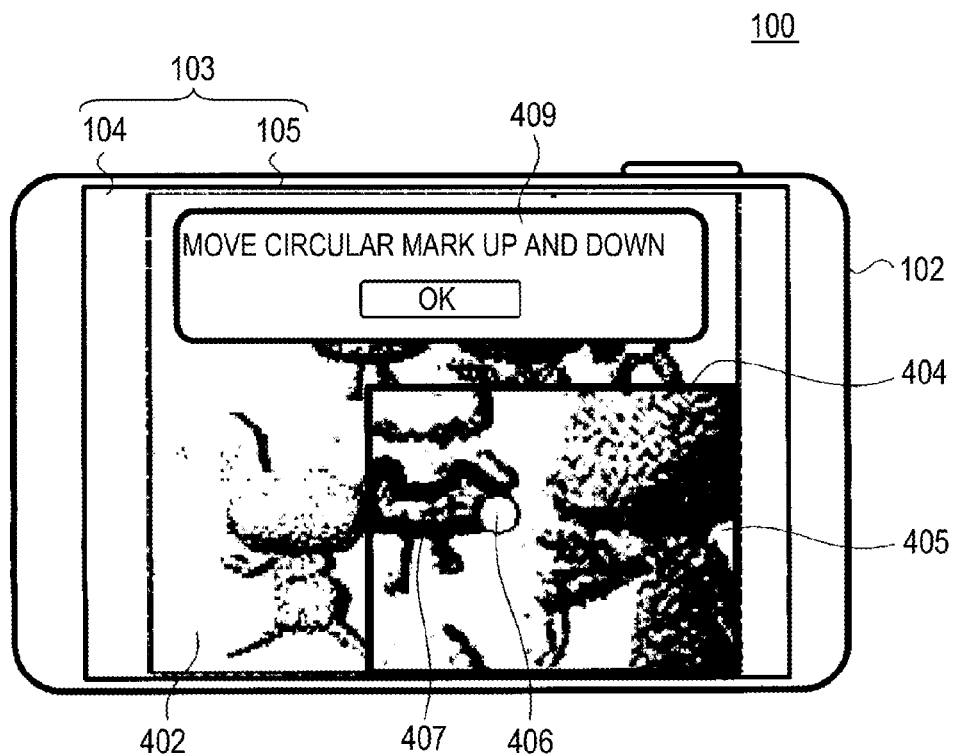
FIG. 9 is an illustration of a screen displayed on a display panel when the process at step S12 in FIG. 3 is performed.

When the "NO" button of the confirmation GUI 408 (see FIG. 8) is touched by the pointer 403 (answer at step S11 is NO), the GUI display control portion 208 stops displaying the confirmation GUI 408. Then, the control portion 208 newly generates a confirmation GUI 409 including a sentence reading "Please move the circular mark up and down" and an "OK" button, as shown in FIG. 9. Next, the confirmation GUI 409 is displayed in a region of the display panel 104 other than the small window 404 (step S12).

Figure 10:
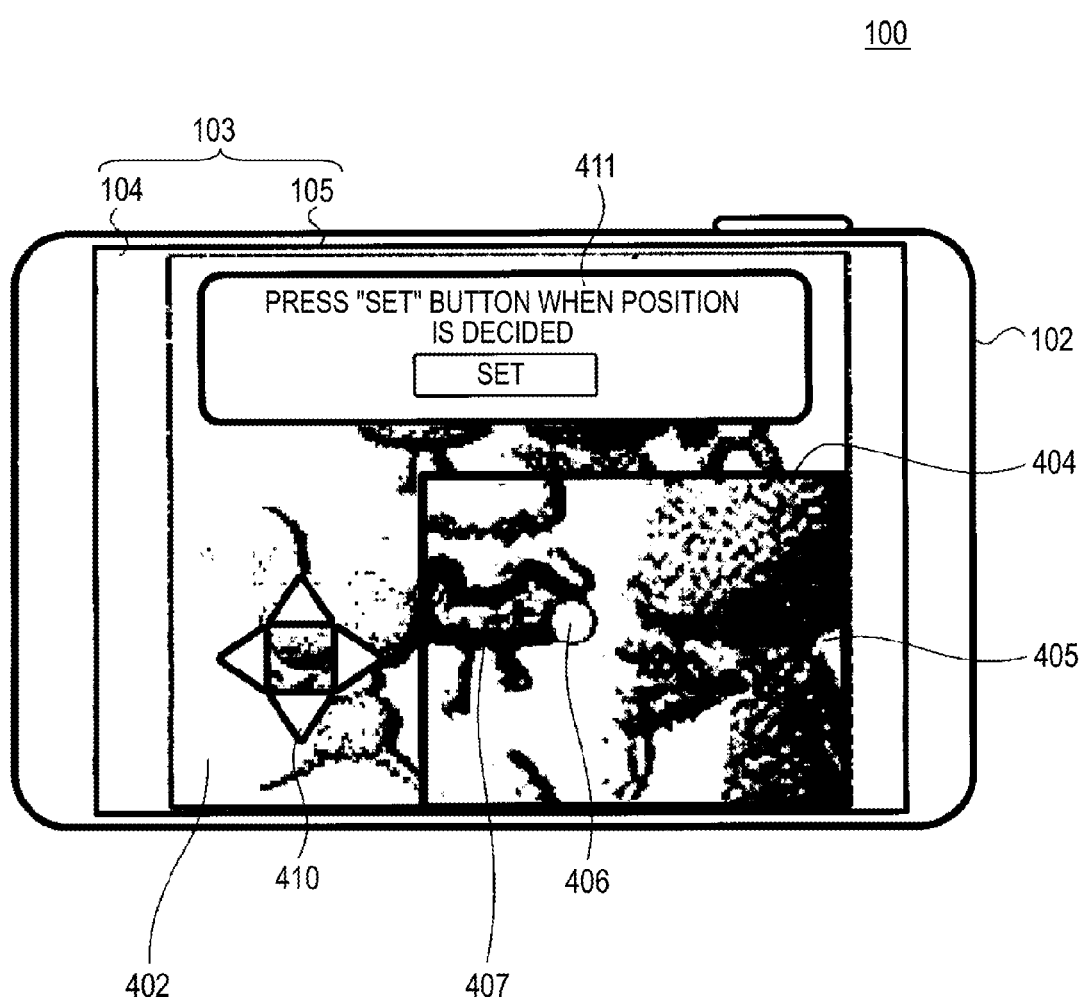
FIG. 10 is an illustration of a screen displayed on a display panel when the process at step S14 in FIG. 3 is performed.
Figure 11:
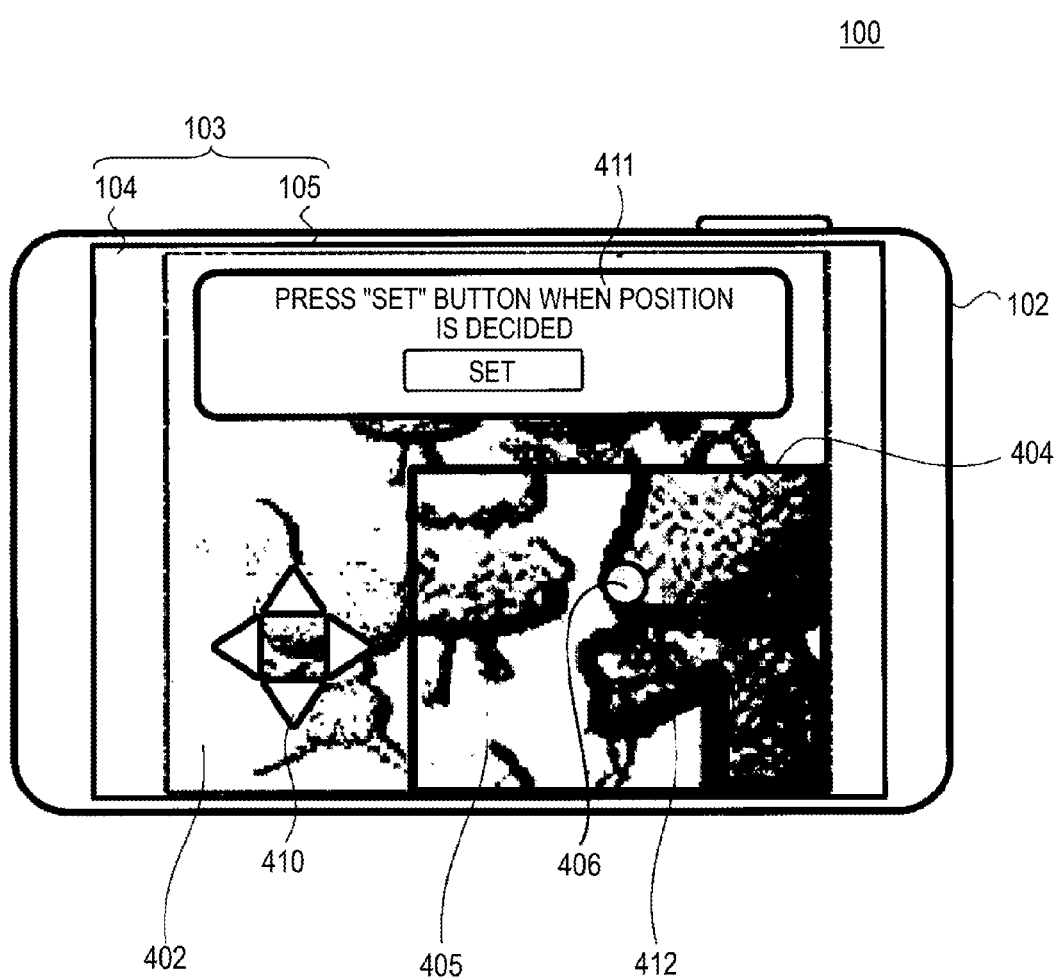
FIG. 11 is an illustration of a screen displayed on a display panel when the process at step S15 in FIG. 3 is performed.

When the "OK" button of the confirmation GUI 409 is touched by the pointer 403 (answer at step S13 is YES), the GUI display control portion 208 stops displaying the confirmation GUI 409. The control portion 208 generates a position adjustment GUI 410 for changing the position of the icon 406 in the form of a circular mark and a confirmation GUI 411 including a sentence reading "Press "Set" button when the position of the icon is decided" and a "Set" button. The position adjustment GUI 410 and the confirmation GUI 411 thus generated are displayed in regions of the display panel 104 other than the small window 404, as shown in FIG. 10 (step S14).

The user moves the position of the icon on the small window 404 by operating cursor keys displayed as icons representing the position adjustment GUI 410 using the pointer 403 (step S15). When the object including the corresponding pixel is changed from the "swim ring" to the "dog" as a result of the movement of the icon 406 (see FIG. 11), the contour display control portion 211 detects the contour of the "dog" as a contour of interest 412. The contour of interest 412 is displayed in the small window 404 with a predetermined color applied to the same.

When the above-described process is completed, the control section 201 checks whether the "Set" button of the confirmation GUI 411 has been touched by the pointer 403 or not (step S16). If the "Set" button has not been touched (answer at step S16 is NO), the flow returns step S15 at which the position of the circular icon 406 is changed further. If the "Set" button has been pressed (answer at step S16 is YES), the flow proceeds to the process at step S11.

When the "NO" button of the confirmation GUI generated at the process of step S21 is touched (answer at step S21 is NO), the GUI display control portion 208 generates a defocus amount adjustment GUI for adjusting the defocus amount of the edited image generated at the process of step S20. The defocus amount adjustment GUI thus generated is displayed on the display panel 104 (step S22). The defocus amount adjustment GUI includes a "+" button and a "−" button. The defocus amount of the edited image is increased by pressing the "+" button and decreased by pressing the "−" button.

Further, the GUI display control portion 208 generates a confirmation GUI including a sentence reading "Press "Set" button when the defocus amount has changed to an optimal value" and a "Set" button. The confirmation GUI thus generated is displayed on the display panel 104 (step S23).

The user operates the "+" button and the "−" button of the defocus amount adjustment GUI. The image processing section changes the present defocus amount of the pixels forming the edited image into a defocus amount according to an operation of the user on the "+" and "−" buttons, whereby a new edited image is generated (step S24).

When the above-described process is completed, the control section 201 checks whether the "Set" button of the confirmation GUI generated at the process of step S23 has been touched by the pointer 403 or not (step S25). When the "Set" button has not been touched yet (answer at step S25 is NO), the flow returns to the process at step S23. If the "Set" button has been touched (answer at step S25 is YES), the GUI display control portion 208 stops displaying the confirmation GUI and the defocus amount adjustment GUI on the display panel 104, and the flow proceeds to the process at step S26.

The process performed by the contour display control portion 211 at steps S10 and S15 to detect the contours of interest 407 and 412 (hereinafter referred to as "contour-of-interest detecting process") will be described with reference to FIGS. 12A and 12B.

Figure 12A:
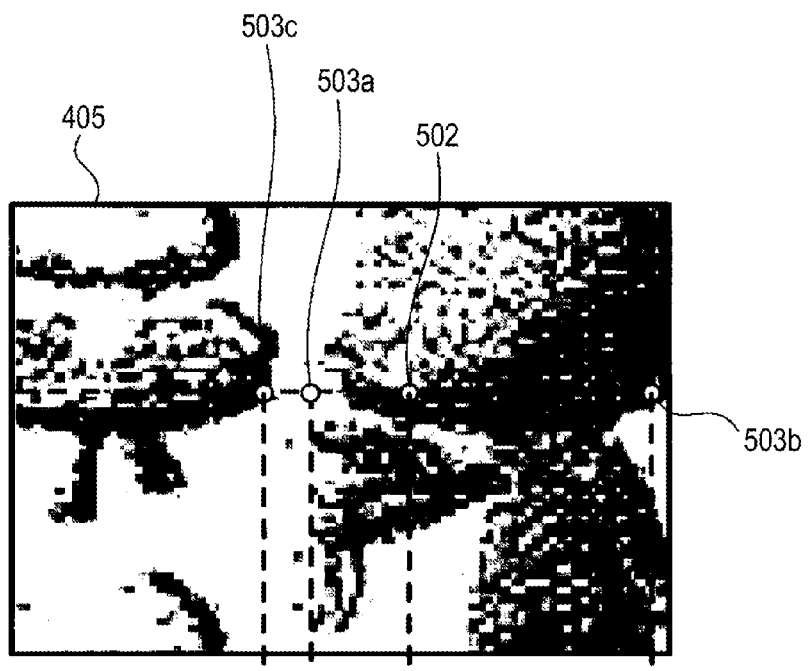
FIGS. 12A and 12B are an illustration and a graph, respectively, showing a process of detecting a contour of interest performed by the image processing apparatus according to the embodiment of the invention.
Figure 12B:
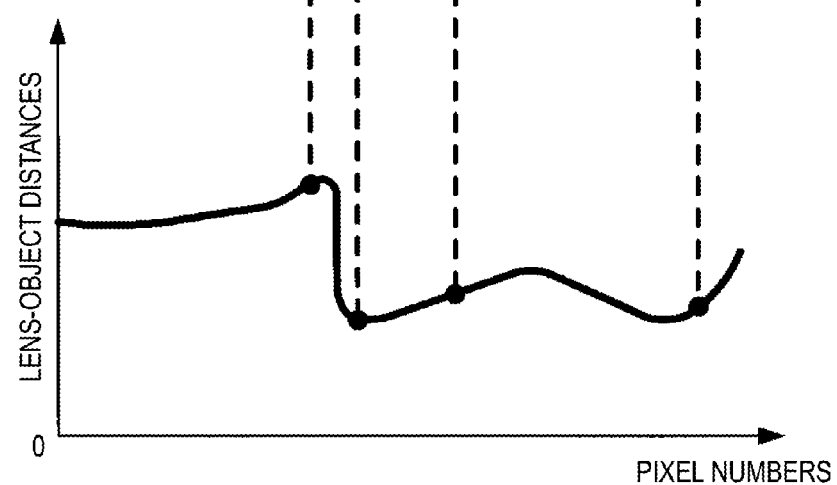

FIGS. 12A and 12B are an illustration and a graph, respectively, showing a process of detecting a contour of interest performed by the image processing apparatus according to the embodiment of the invention.

FIG. 12A is an illustration of an enlarged image displayed on the small window.

FIG. 12B is a distribution graph representing a depth map for regions associated with the pixels indicated by broken lines in FIG. 12A. The vertical axis of FIG. 12B represents lens-object distances indicated by distance data as described above, and the horizontal axis represents pixel numbers assigned to the pixels.

When the contour-of-interest detecting process is started, the contour display control portion 211 acquires a depth map of a row of pixels (pixels in an n-th row) of an enlarged image 405, the row of pixels including a corresponding pixel 502 that is currently set. The depth map represents distance data of regions associated with the pixels in the n-th row. The control section calculates a differential depth map by differentiating the acquired depth map with respect to pixel numbers in order to find a region of the enlarged image 405 where an abrupt change in the lens-object distance takes place or to identify the pixel numbers of contour pixels 503 forming part of contours among the pixels in the n-th row (process 1).

Next, the contour display control portion 211 detects pixel numbers at which the differential depth map thus calculated has an absolute value greater than a predetermined threshold. Pixels having pixel numbers thus detected are contour pixels 503 (process 2).

Next, the contour display control portion 211 recognizes two contour pixels 503a and 503b which are closest to the corresponding pixel 502 as part of pixels forming a contour of interest (process 3). Those pixels will be hereinafter referred to as "relevant pixels".

Then, the contour display control portion 211 acquires a depth map of pixels in the (n+1)-th row (distance data of regions associated with the pixel in the (n+1)-th row. The acquired depth map is differentiated with respect to pixel numbers to calculate a differentiated field intensity distribution (process 4). The same process as the process 2 is carried out on the differentiated field intensity distribution calculated by the process 4 (process 5).

Next, the contour display control portion 211 recognizes pixels adjacent to the relevant pixels in the n-th row as relevant pixels in the (n+1)-th row (process 6). Those pixels will be referred to as "boundary pixels 502a and 502b".

When the above-described process is completed, the contour display control portion 211 repeats the processes 4 to 6 (process 7). The processes 1 to 7 are performed also in the direction in which columns of pixels of the enlarged image extend, whereby the contour of interest will be two-dimensionally detected (process 8).

As described above, according to the embodiment of the invention, an enlarged image including a pixel of interest and an icon indicating the position of a corresponding pixel corresponding to the pixel of interest can be displayed in a small window. As a result, a user can clearly recognize a pixel of interest selected by the user from such an enlarged image, which makes it possible to prevent errors in selecting a pixel of interest. This is advantageous in that a user can obtain a defocused image as desired.

According to the embodiment of the invention, when the icon is moved on the small window to change the corresponding pixel, the pixel of interest can be also changed accordingly. Thus, the updated pixel of interest can be recognized, which allows errors in selecting a pixel of interest to be prevented with higher reliability.

According to the embodiment of the invention, an enlarged image of an object including a pixel of interest can be displayed in the small window with the contour of the object highlighted. Thus, a user can easily recognize the object including the pixel of interest. It is therefore possible to prevent erroneous election of a pixel of interest with higher reliability.

Figure 13:
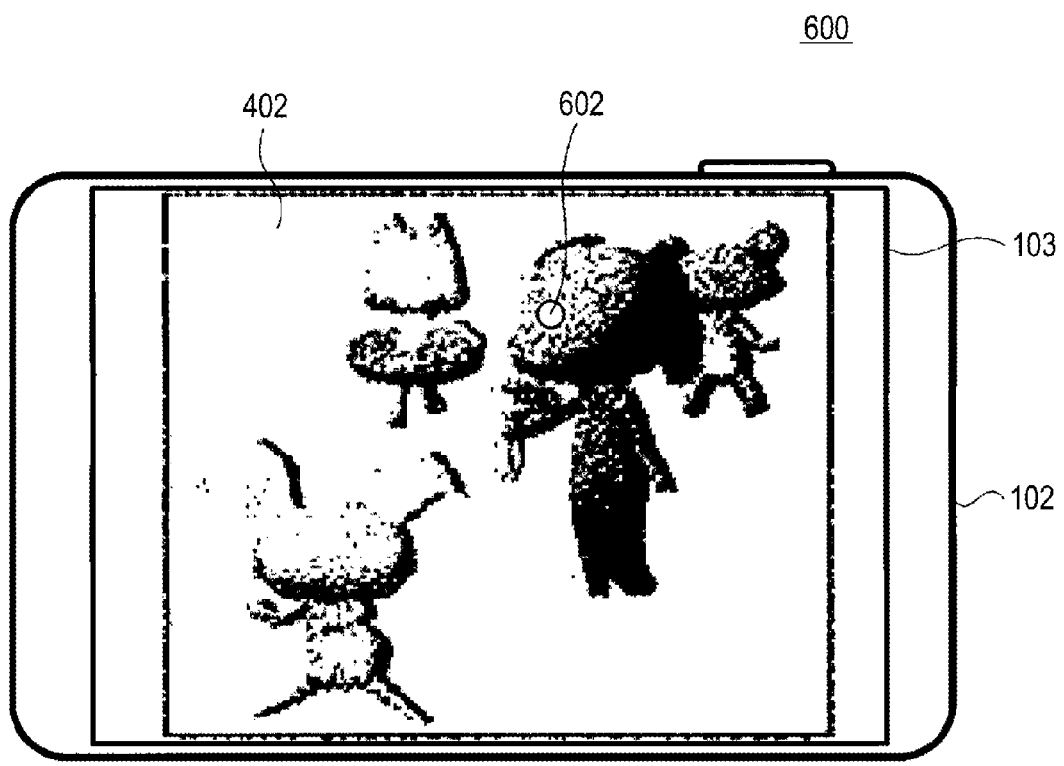
FIG. 13 is an illustration of an image processing apparatus according to a modification of the embodiment.
Figure 14:
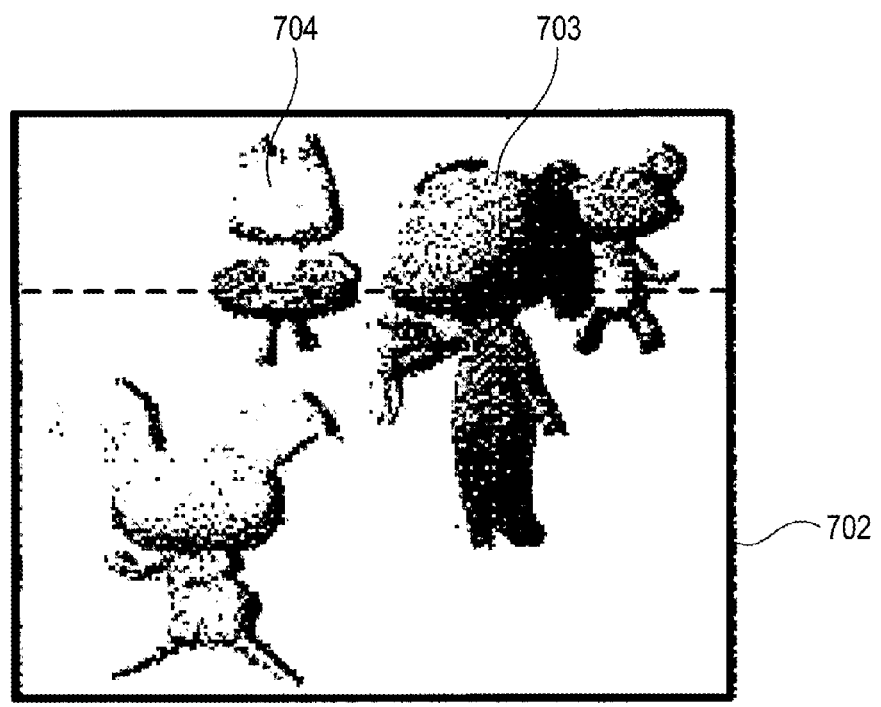
FIG. 14 is an illustration of a still image displayed on a display section of an image processing apparatus according to the related art.
Figure 15:
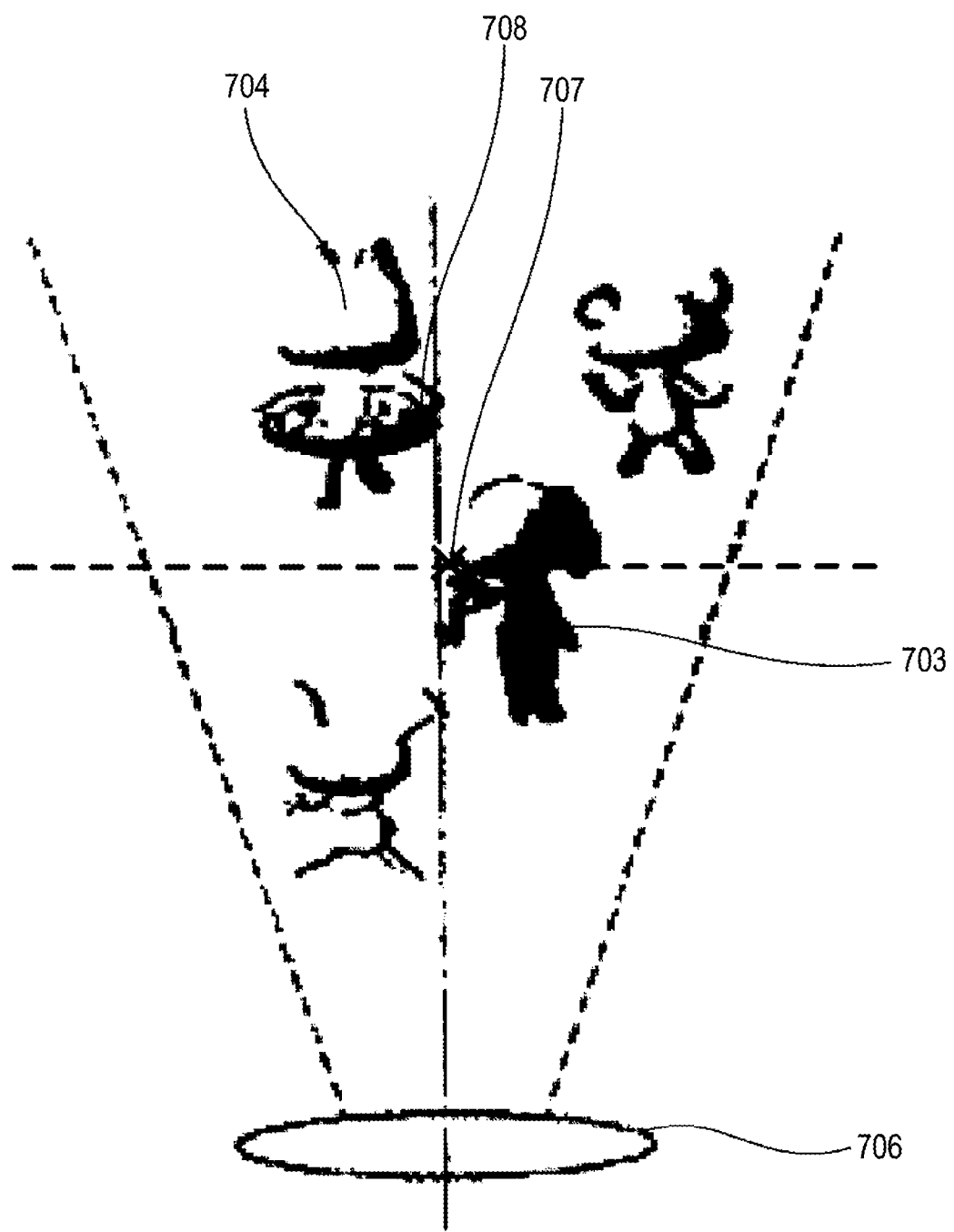
FIG. 15 is an illustration showing a relationship between the positions that an imaging lens and objects assumed when the still image shown in FIG. 14 was photographed.
Figure 16:
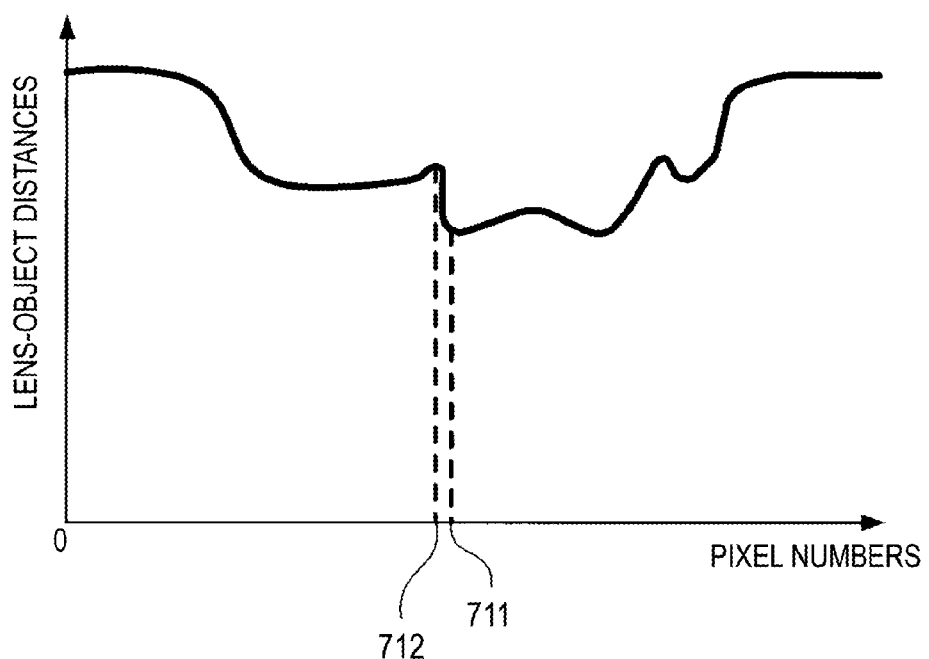
FIG. 16 is a distribution graph representing a depth map of regions associated with pixels in the positions indicated by doted lines in FIG. 14.
Figure 17:
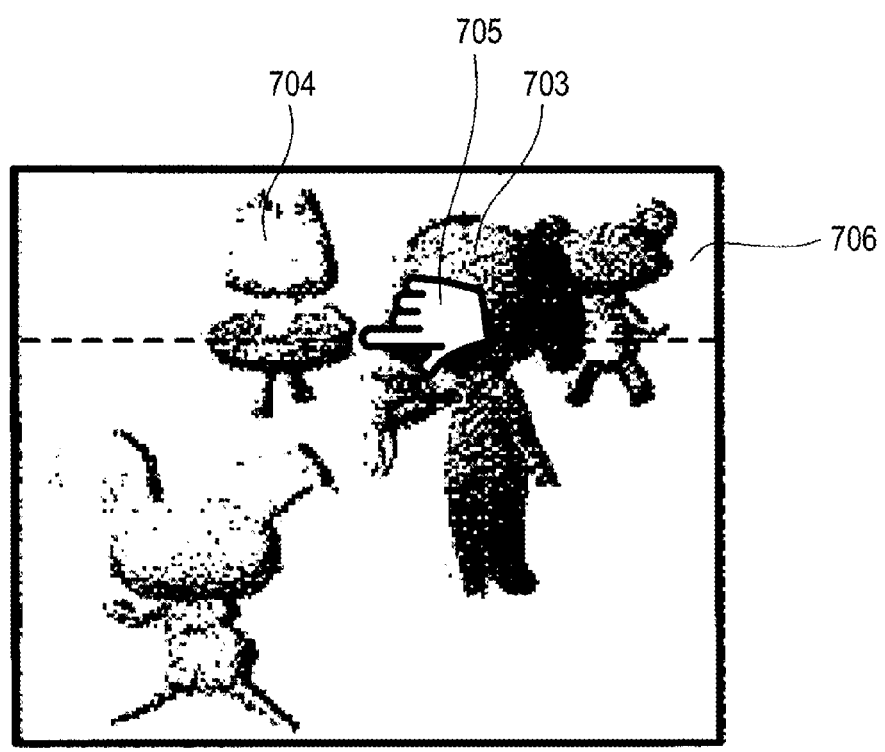
FIG. 17 is an illustration how a user selects a pixel of interest from he still image shown in FIG. 14.

In the above-described embodiment of the invention, an icon 406 representing a corresponding pixel is moved on an enlarged image 405 to select a pixel of interest. Alternatively, as shown in FIG. 13, an icon 602 representing a pixel of interest mat be displayed on a selected image 402, and the icon 602 may be moved on the selected image 402 to select a pixel of interest directly. Since such an approach involves a smaller amount of data to be processed, the process can be performed at a higher speed. Obviously, a selected image may be displayed such that the contour of an object including a pixel of interest will be highlighted.

When a contour of interest is detected in the above-described embodiment of the invention, boundary pixels are detected by differentiating a depth map. Alternatively, boundary pixels may be detected using double differentiation of a depth map. Specifically, a pixel among pixels forming an enlarged image constitutes a boundary pixel when a depth map of the pixels has a double differentiated value of 0 at that pixel.

In the above-described embodiment of the invention, a contour of interest is detected using distance data. Alternatively, a contour of interest may be detected using luminance. For example, the luminance of an arbitrary pixel of an enlarged image may be compared with the luminance of a pixel adjacent to the same, and a contour of interest may be detected from pixels which have luminance resulting in a luminance difference of a predetermined value or more when compared with adjacent pixels as thus described. Obviously, a contour of interest may alternatively be detected by detecting the object from a gray image.

In the above-described embodiment of the invention, the position of the icon 406 is changed using the position adjustment GUI 410. Alternatively, the icon 406 may be moved to a position on the small window 404 by touching the position with the pointer.

Although the above-described embodiment of the invention employs a circular icon, the invention is not limited to such an icon. For example, an icon in the form of a cross may be used. In this case, since the cross-like icon obscures a smaller area of an image behind the same when compared to the circular icon, a user can access a greater amount of information.

In the above-described embodiment of the invention, the processes at steps S14, S16, S22, S23, and S25 involve operations performed on a GUI. Alternatively, a hardware key may be provided on the body of the apparatus, and those operations may be performed using the hardware key.

In the above-described embodiment of the invention, edited image data are compressed according to the JPEG method. However, the invention is not limited to such a compression method. Foe example, compression may be carried out according to the GIF (Graphics Interchange Format) method, the PNG (Portable Network Graphics) method, the BMP (Bitmap) method, or the TIFF (Tagged Image File Format) method.

In the above-described embodiment of the invention, the file name of an image file is incremented when the file is updated. Alternatively, the updated file may be saved in a folder having an incremented folder name.

In the above-described embodiment of the invention, a right-bottom partial region of the display screen is allocated as a small window, and an enlarged image is displayed in the small window. The invention is not limited to such a configuration. A partial region of the display panel may alternatively be allocated as a small window such that a pixel of interest selected by a user is located in the middle of the window, and an enlarged image may be displayed in the small window such that it overlaps the original image. As a result, the user can check the corresponding pixel without turning his or her eyes away from the position associated with the pixel of interest. This is advantageous in that the corresponding pixel can be more easily operated compared to a corresponding pixel displayed in a small window located in a bottom-right part of the display panel.

When a defocused image is generated according to the embodiment of the invention, the amount of defocus may be decided based on the imaging mode employed. The amount of defocus may alternatively be decided by checking the scene of interest or detecting the object. Further, the decision may be made based on the user's history of learning of defocused image edition.

In the above-described embodiment, the amount of defocus imparted to a still image is adjusted such that a position associated with a pixel of interest will be focused. The amount of defocus imparted to a moving image can be also adjusted such that a position associated with a pixel of interest will be focused in each frame of the moving image. The following steps are taken to adjust the amount of defocus imparted to a moving image. The amount of defocus imparted to a moving image can be adjusted by the image processing section 206 and the control section 201 in the same manner as in the above-described embodiment.

First, a user selects a moving image editing mode to start edition of a moving image. Then, a moving image to be edited is selected. Next, the selected moving image is reproduced, and the user selects the image of a frame to be edited (selected image). The user decides a pixel of interest of the selected image in the same manner as in the above-described embodiment.

When the reproduction of the moving image is resumed after the pixel of interest is selected, the image processing section 206 performs a defocus process such that a position associated with the pixel of interest will be focused in each frame. Specifically, an image formed by pixels located within a predetermined range including the present pixel of interest (surrounding range) is sliced from the selected image (such an image will be referred to as "template image"). Template matching is carried out by comparing the template image with the image in each of frames forming the moving image. The template image is compared with the image in each frame in terms of luminance, lens-object distance represented by distance data, or color.

Next, a region of interest resembling the template image is detected from each frame. Specifically, such a region of interest is closest to the template image in terms of a value indicating luminance, lens-object distance represented by distance data, or color. A pixel that is closest to the region associated with the pixel of interest in terms of lens-object distance is identified in the region of interest detected in each frame. Thus, the pixel of interest is traced in each frame. Next, the amount of defocus imparted to the image in each frame is adjusted based on a depth map such that the position of the pixel of interest will be focused in each frame.

The amount of defocus imparted to a moving image may be adjusted using an alternative method including the steps of detecting an object image including a pixel of interest in motion (detecting the movement of the object image) in each frame and comparing each detected object image in motion with a template image to carry out template matching. For example, in the case of a moving image encoded according to the MPEG (Moving Picture Experts Group) method, the above-described moving body detecting process may be performed in conjunction with an MPEG type signal process. In this case, the moving image is detected in motion as described above while decoding the same according to the MPEG method.

When a defocus process as thus described is completed, the control section 201 records the moving image having the adjusted defocus amount in the recording medium 205 as a moving image file and increments the file name assigned to the moving image. A moving image file saved in the recording medium 205 as thus described may split or joined with other files, which is advantageous in that a moving image generated by a defocus process can be effectively used.

The present application contains subject matter related to that disclosed in Japanese Priority Patent Application JP 2010-065022 filed in the Japan Patent Office on Mar. 19, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a display controller configured to:
control recording of a first image and metadata including depth information associated with the first image into a storage medium;
control display of the first image;
control display of an icon having a predetermined size and shape at a first pointed position on the first image at which a pointer is detected as having been pointed, the first pointed position corresponding to a first pixel of an object in the first image;
control display of the icon with the predetermined size and shape at a second pointed position on the first image at which the pointer is detected as having been pointed, the second pointed position corresponding to a second pixel of the object in the first image;
control display of a sub screen including an enlarged image of a first region of the first image, the first region including the second pixel of the object in the first image, wherein the sub screen is displayed overlapping the first image; and
control display of a sub screen icon identifying on the sub screen a position of the enlarged image corresponding to the second pointed position; and an image processor configured to:
calculate a respective defocus amount to be applied to at least two pixels of a plurality of pixels of the first image based on depth information representing a plurality of distances between a lens and a plurality of portions of the object in the first image; and
generate a second image at least by applying the respective defocus amount to the at least two pixels such that at least a portion of the object in the second image is in focus, the at least a portion of the object in the second image corresponding to the second pointed position on the first image,
wherein:
the display controller is further configured to control display of the second image,
the display controller is further configured to control recording of the second image into the storage medium,
the display controller is further configured to, before the image processor generates the second image, control display of a prompt to a user to confirm selection of the second pointed position, and
the first image comprises an original image and the second image comprises a defocused image corresponding to the original image.

2. An image processing apparatus according to claim 1, wherein the sub screen is configured to display the enlarged image by altering display of a part of the first image.

3. An image processing apparatus according to claim 1, wherein the display controller is further configured to change a displayed position of the sub screen icon.

4. An image processing apparatus according to claim 1, wherein the display controller is further configured to control display of contour information, the contour information indicating a contour of the object, the contour enclosing the second pointed position.

5. An image processing apparatus according to claim 4, wherein the contour information is generated by using the depth information.

6. An image processing apparatus according to claim 5, wherein the contour information is generated based on a differentiated value of a depth information distribution of the first image being greater than a predetermined threshold.

7. An image processing apparatus according to claim 5, wherein the contour information is generated based on a double differentiated value of a depth information distribution of the first image being zero.

8. An image processing apparatus according to claim 4, wherein the contour information is generated by using luminance information of the first image.

9. An image processing apparatus according to claim 8, wherein the contour information is generated by detecting a pixel having luminance resulting in a luminance difference of greater than or equal to a predetermined value compared with an adjacent pixel.

10. An image processing apparatus according to claim 1, wherein at least a portion of the object in the first image is not in focus and corresponds to the first pointed position.

11. An image processing apparatus according to claim 1, wherein the image processor is configured to generate the second image by controlling blur.

12. An image processing apparatus according to claim 11, wherein the image processor is configured to control the blur in the second image based on the second pointed position.

13. An image processing apparatus according to claim 11, wherein the image processor is configured to control a value of the blur based on an operation input by a user.

14. An image processing apparatus according to claim 13, wherein the display controller is further configured to control display of a blur indicator indicating a value of the blur.

15. An image processing apparatus according to claim 1, wherein the first image comprises a frame of a movie.

16. An image processing apparatus according to claim 1, further comprising a display configured to display information received from the display controller and a touch sensor configured to detect the pointer.

17. An image processing apparatus according to claim 1, wherein at least a portion of the object in the first image is not in focus and corresponds to the second pointed position.

18. An image processing method comprising:
controlling recording of a first image and metadata including depth information associated with the first image into a storage medium;
controlling display of the first image;
controlling display of an icon having a predetermined size and shape at a first pointed position on the first image at which a pointer is detected as having been pointed, the first pointed position corresponding to a first pixel of an object in the first image;
controlling display of the icon with the predetermined size and shape at a second pointed position on the first image at which the pointer is detected as having been pointed, the second pointed position corresponding to a second pixel of the object in the first image;
controlling display of a sub screen including an enlarged image of a first region of the first image, the first region including the second pixel of the object in the first image, wherein the sub screen is displayed overlapping the first image;

controlling display of a sub screen icon identifying on the sub screen a position of the enlarged image corresponding to the second pointed position;

calculating a respective defocus amount to be applied to at least two pixels of a plurality of pixels of the first image based on depth information representing a plurality of distances between a lens and a plurality of portions of the object in the first image;

before generating a second image, controlling display of a prompt to a user to confirm selection of the second pointed position;

generating the second image at least by applying the respective defocus amount to the at least two pixels such that at least a portion of the object in the second image is in focus, the at least a portion of the object in the second image corresponding to the second pointed position on the first images;

controlling display of the second image; and controlling recording of the second image into the storage medium, wherein the first image comprises an original image and the second image comprises a defocused image corresponding to the original image.

19. An image processing method according to claim 18, further comprising displaying the enlarged image on the sub screen by altering display of a part of the first image.

20. An image processing method according to claim 18, further comprising changing a displayed position of the sub screen icon.

21. An image processing method according to claim 18, further comprising controlling display of contour information, the contour information indicating a contour of the object, the contour enclosing the second pointed position.

22. An image processing method according to claim 21, further comprising generating the contour information by using the depth information.

23. An image processing method according to claim 22, wherein generating the contour information comprises basing the contour information on a differentiated value of a depth information distribution of the first image being greater than a predetermined threshold.

24. An image processing method according to claim 22, wherein generating the contour information comprises basing the contour information on a double differentiated value of a depth information distribution of the first image being zero.

25. An image processing method according to claim 21, wherein generating the contour information comprises detecting a pixel having luminance resulting in a luminance difference of greater than or equal to a predetermined value compared with an adjacent pixel.

26. An image processing method according to claim 21, wherein the contour information is generated by using luminance information of the first image.

27. An image processing method according to claim 18, wherein at least a portion of the object in the first image is not in focus and corresponds to the first pointed position.

28. An image processing method according to claim 18, further comprising generating the second image by controlling blur.

29. An image processing method according to claim 28, further comprising controlling the blur in the second image based on the second pointed position.

30. An image processing method according to claim 28, further comprising controlling a value of the blur based on an operation input by a user.

31. An image processing method according to claim 30, further comprising controlling display of a blur indicator indicating a value of the blur.

32. An image processing method according to claim 18, wherein the first image comprises a frame of a movie.

33. An image processing method according to claim 18, wherein at least a portion of the object in the first image is not in focus and corresponds to the second pointed position.

34. A computer-readable device having instructions that, when executed by a processor, perform a method comprising:

controlling recording of a first image and metadata including depth information associated with the first image into a storage medium;

controlling display of the first image;

controlling display of an icon having a predetermined size and shape at a first pointed position on the first image at which a pointer is detected as having been pointed, the first pointed position corresponding to a first pixel of an object in the first image;

controlling display of the icon with the predetermined size and shape at a second pointed position on the first image at which the pointer is detected as having been pointed, the second pointed position corresponding to a second pixel of the object in the first image;

controlling display of a sub screen including an enlarged image of a first region of the first image, the first region including the second pixel of the object in the first image, wherein the sub screen is displayed overlapping the first image;

controlling display of a sub screen icon identifying on the sub screen a position of the enlarged image corresponding to the second pointed position;

calculating a respective defocus amount to be applied to at least two pixels of a plurality of pixels of the first image based on depth information representing a plurality of distances between a lens and a plurality of portions of the object in the first image;

before generating a second image, controlling display of a prompt to a user to confirm selection of the second pointed position;

generating the second image at least by applying the respective defocus amount to the at least two pixels such that at least a portion of the object in the second image is in focus, the at least a portion of the object in the second image corresponding to the second pointed position on the first image;

controlling display of the second image; and controlling recording of the second image into the storage medium, wherein the first image comprises an original image and the second image comprises a defocused image corresponding to the original image.

35. A computer-readable device according to claim 34, wherein the method further comprises displaying the enlarged image on the sub screen by altering display of a part of the first image.

36. A computer-readable device according to claim 34, wherein the method further comprises changing a displayed position of the sub screen icon.

37. A computer-readable device according to claim 34, wherein the method further comprises controlling display of contour information, the contour information indicating a contour of the object, the contour enclosing the second pointed position.

38. A computer-readable device according to claim 37, wherein the method further comprises generating the contour information by using the depth information.

39. A computer-readable device according to claim 38, wherein generating the contour information comprises basing the contour information on a differentiated value of a depth information distribution of the first image being greater than a predetermined threshold.

40. A computer-readable device according to claim 39, wherein generating the contour information comprises basing the contour information on a double differentiated value of a depth information distribution of the first image being zero.

41. A computer-readable device according to claim 38, wherein generating the contour information comprises detecting a pixel having luminance resulting in a luminance difference of greater than or equal to a predetermined value compared with an adjacent pixel.

42. A computer-readable device according to claim 37, wherein the contour information is generated by using luminance information of the first image.

43. A computer-readable device according to claim 34, wherein at least a portion of the object in the first image is not in focus and corresponds to the first pointed position.

44. A computer-readable device according to claim 34, wherein the method further comprises generating the second image by controlling blur.

45. A computer-readable device according to claim 44, wherein the method further comprises controlling the blur in the second image based on the second pointed position.

46. A computer-readable device according to claim 44, wherein the method further comprises controlling a value of the blur based on an operation input by a user.

47. A computer-readable device according to claim 46, wherein the method further comprises controlling display of a blur indicator indicating a value of the blur.

48. A computer-readable device according to claim 34, wherein the first image comprises a frame of a movie.

49. A computer-readable device according to claim 34, wherein at least a portion of the object in the first image is not in focus and corresponds the second pointed position.

* * * * *